US012809954B2

(12) United States Patent
Gusakov et al.

(10) Patent No.: US 12,809,954 B2
(45) Date of Patent: Nov. 24, 2026

(54) DECOUPLING IDENTITY MANAGEMENT AND AUTHENTICATION FROM ATTRIBUTE PROVISIONING

(71) Applicant: Navan, Inc., Palo Alto, CA (US)

(72) Inventors: Oleg Gusakov, Redwood City, CA (US); Iurii Iurchenko, Campbell, CA (US)

(73) Assignee: Navan, Inc., Palo Alto, CA (US)

( * ) Notice: Subject to any disclaimer, the term of this patent is extended or adjusted under 35 U.S.C. 154(b) by 20 days.

(21) Appl. No.: 18/825,572

(22) Filed: Sep. 5, 2024

(65) Prior Publication Data

US 2025/0086259 A1 Mar. 13, 2025

Related U.S. Application Data

(60) Provisional application No. 63/537,173, filed on Sep. 7, 2023.

(51) Int. Cl.
*G06F 21/31* (2013.01)
*G06F 21/62* (2013.01)

(52) U.S. Cl.
CPC .......... *G06F 21/31* (2013.01); *G06F 21/6218* (2013.01)

(58) Field of Classification Search
CPC ............................ G06F 21/31; G06F 21/6218
USPC ............................................................ 726/4
See application file for complete search history.

(56) References Cited

U.S. PATENT DOCUMENTS

2020/0257700 A1* 8/2020 Xu ........................ G06F 16/213
2020/0260241 A1* 8/2020 Sicard .................. H04W 8/245
2021/0392132 A1* 12/2021 Olden ................ H04L 67/1095
2022/0303348 A1* 9/2022 Glaser ................... H04L 67/566
2023/0351044 A1* 11/2023 Henderson ........... G06F 21/602
2024/0118815 A1* 4/2024 Muthuthodi Varikkottil .............. G06F 21/6218

* cited by examiner

*Primary Examiner* — Anthony D Brown
(74) *Attorney, Agent, or Firm* — Raubvogel Law Office

(57) ABSTRACT

According to various embodiments, the system and method described herein provide techniques for decoupling identity management and authentication from identity attribute provisioning and additional extended management, thus allowing identity attribute-based authorization to be maintained inside a protected system while delegating authentication to a centralized identity provider (IDP). In at least one embodiment, a user lifecycle component (ULC) is situated between the IDP and an identity consumption platform. The IDP is delegated IDP responsibilities and provides identity authentication to the identity consumption platform, while the ULC provides provisioning and attribute management that is further used for authorization within the identity consumption platform. In at least one embodiment, the ULC may use APIs (such as Okta APIs) to read identity statuses from the IDP. An attribute mapping database may be provided, to maintain mappings between values of identity groups attributes and a set of groups.

24 Claims, 4 Drawing Sheets

DECOUPLING IDENTITY MANAGEMENT AND AUTHENTICATION FROM ATTRIBUTE PROVISIONING

CROSS-REFERENCE TO RELATED APPLICATION

This application claims the benefit of U.S. Provisional Patent Application Ser. No. 63/537,173, filed on Sep. 7, 2023 and entitled "Decoupling Identity Management and Authentication from Attribute Provisioning," which is incorporated by reference as though set forth herein in its entirety.

TECHNICAL FIELD

The present document relates to systems and methods for identity management, authentication, and attribute provisioning in secure systems.

BACKGROUND

In many organizations that include or use access-controlled systems and/or resources, one team or entity may be responsible for centralized identity management, while other teams or entities may be responsible for security. In general, in such organizations, security may require that each team has full control over their own domain but is not able to make security-related changes within other teams' domains.

Conventionally, identity providers (IDPs) such as Okta (via the Okta Customer Identity Cloud) generally attempt to render both centralized authentication (authC) and authorization (authZ) services to other systems. However, since such systems usually host both services, whoever controls/manages the IDP generally takes over control over account provisioning and authorization for the end system. As a result, using conventional approaches, the team responsible for the security of the system must generally rely on the team that controls the IDP in making correct provisioning and authorization decisions for their domain.

Some "centralized authorization management" solutions may offer separate authorization management; however, such solutions are usually controlled by the same team that controls the IDP. In many cases, such systems can manage licenses but not user attribute mapping. In addition, such arrangements generally keep end system attribute mapping control outside of the team directly responsible for the end system, because ultimate control still lies with the team managing the IDP.

SUMMARY

According to various embodiments, the system and method described herein improve upon existing systems by enforcing separation of responsibilities to facilitate an appropriate level of control by each team over its domain, while maximizing security posture. In particular, the described system and method provide techniques for decoupling identity management and authentication from identity attribute provisioning and additional extended management, thus allowing identity attribute-based authorization to be maintained inside a protected system while delegating authentication to a centralized identity provider (IDP).

In at least one embodiment, the system may be implemented as mechanism for separating responsibilities between, for example, identity management and authentication (performed by an IDP such as the Okta Customer Identity Cloud) and attribute provisioning and/or mapping (performed by a separate component as described herein). The identity management and authentication, as well as the attribute provisioning and/or mapping, may be used by an identity consumption platform such as Amazon Web Services IAM Identity Center (AWS IAM IDC), StrongDM, KnowBe4, or the like).

In at least one embodiment, the component for performing attribute provisioning and/or mapping may be implemented as a user lifecycle component (ULC) that may be situated between the IDP and the identity consumption platform. The IDP may be delegated IDP responsibilities and may provide identity authentication to the identity consumption platform, while the ULC may provide provisioning and attribute management that is further used for authorization within the identity consumption platform.

In at least one embodiment, the ULC may use APIs (such as Okta APIs) to read identity statuses from the IDP. An attribute mapping database (also referred to as a ULC database) may be provided, to maintain mappings between values of attributes and a set of groups. Such database may be under full control of an end-system management team and may be fully automated, so that team members can modify user attribute mappings as desired, causing updates to be propagated appropriately. The ULC may read and write identity state into the identity consumption platform, for example using SCIM APIs. The ULC may also use AWS identity store APIs to compensate for any deficiencies of an AWS SCIM APIs implementation.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
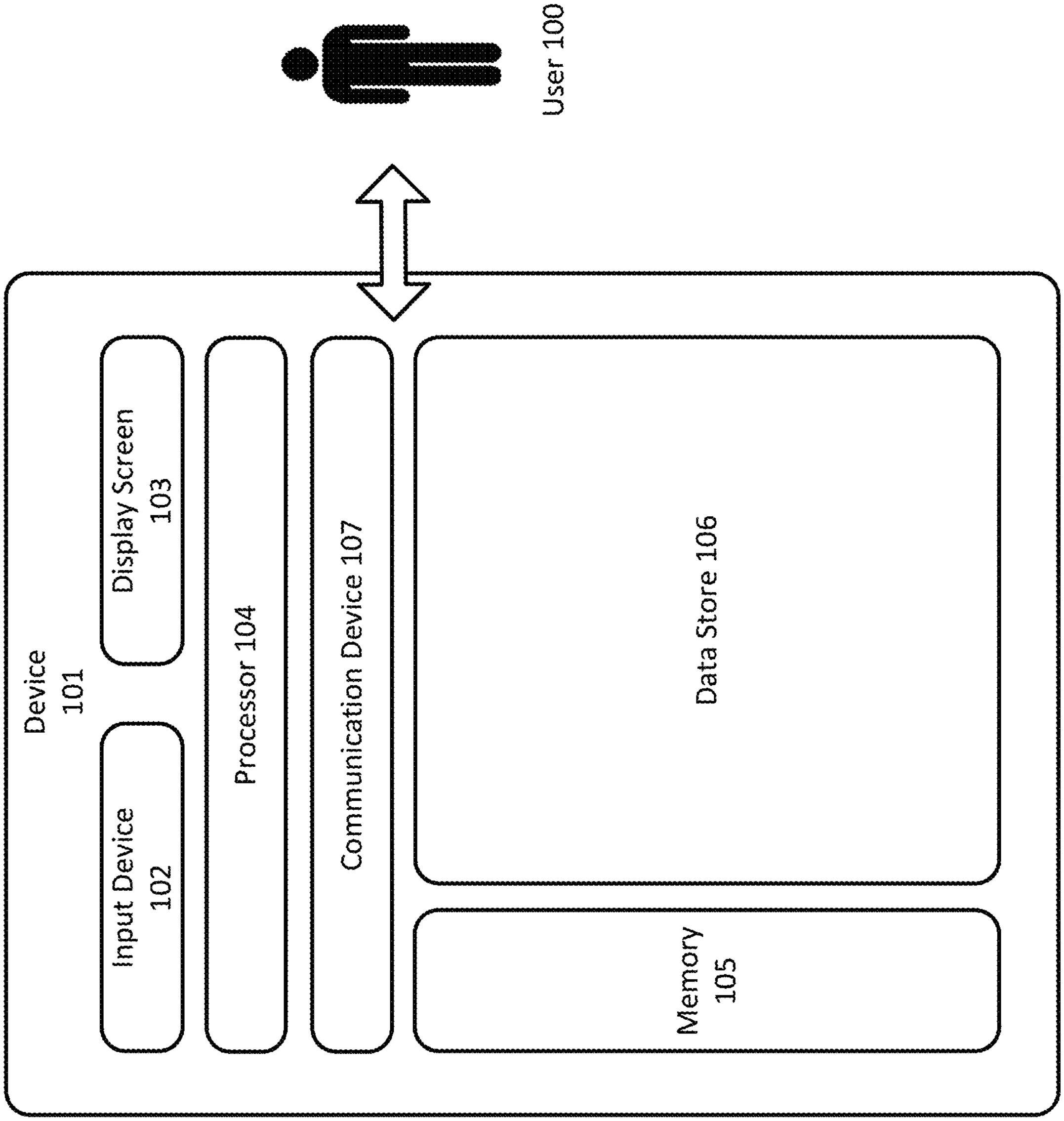
FIG. 1 is a block diagram depicting a hardware architecture for implementing the techniques described herein according to one embodiment.

The systems and methods set forth herein may be applied in many contexts in which it may be useful to perform identity management, authentication, and attribute provisioning. For illustrative purposes, the system and method are described herein in the context of a user lifecycle component (ULC) that may be communicatively situated between an IDP (such as Okta) and an identity consumption platform such as an Amazon Web Services IAM Identity Center (AWS IAM IDC, or AWS IDC, or simply AWS). One skilled in the art will recognize, however, that similar techniques may be used in other contexts. For example, the techniques described herein may be used in any context in which it may be useful or appropriate to decouple identity management and authentication from attribute provisioning.

In some embodiments, one or more hardware and/or software components, as shown and described below in connection with FIGS. 1 and 2, may be used to implement the system and method described herein. In at least one embodiment, such components may be implemented in a cloud computing-based client/server architecture, using, for example, Amazon Web Services (AWS), which is an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein may be implemented using other architectures, such as for example a standalone computing device rather than a client/server architecture.

Further, the functions and/or method steps set forth herein may be carried out by software running on one or more of device(s) 101, client device(s) 108, server(s) 110, and/or other components. This software may optionally be multi-function software that may be used to retrieve, store, manipulate, and/or otherwise use data stored in data storage devices and/or to carry out one or more other functions.

Definitions and Concepts

For illustrative purposes and for ease of explanation, the following definitions and concepts are used herein:

- A "customer", "user", or "end user", such as user 100 referenced herein, may be an individual person, or may be an enterprise, company, family, representative, and/or group that may optionally include one or more individuals.
- A "data store", such as data store 106 referenced herein, may be any device capable of digital data storage, including any known hardware for nonvolatile and/or volatile data storage. A collection of data stores may form a "data storage system" that can be accessed by multiple customers.
- A "computing device" or "device", such as client device 101 or 108, may be any electronic device capable of digital data processing. In at least one embodiment, the device may communicate with a server such as server 110, provide output to a customer, and accept input from a customer.
- A "server", such as server 110, may be a computing device that is configured to run software for back-end processing, and may also provide data storage, either via a local data store, or via connection to a remote data store.
- An "entity" may be any individual or group of individuals, wherein such group may include a company, corporation, organization, firm, educational institution, team, religious organization, political party, and/or the like.

System Architecture

According to various embodiments, the systems and methods described herein may be implemented on any electronic device or set of interconnected electronic devices, each equipped to receive, store, and present information. Each electronic device may be, for example, a server, desktop computer, laptop computer, smartphone, tablet computer, and/or the like. As described herein, some devices may be designated as client devices, which are generally operated by end users. Other devices may be designated as servers, which generally conduct back-end operations and communicate with client devices (and/or with other servers) via a communications network such as the Internet. In at least one embodiment, the techniques described herein may be implemented in a cloud computing environment using techniques that are known to those of skill in the art.

In addition, one skilled in the art will recognize that the techniques described herein may be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture may be used, for example, for implementing the techniques of the system in a computer or other device 101. Device 101 may be any electronic device, including one of those listed above.

In at least one embodiment, device 101 includes a number of hardware components that are well known to those skilled in the art. Input device 102 may be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 may be omitted or functionally combined with one or more other components.

Data store 106 may be any magnetic, optical, or electronic storage device for data in digital form; examples include flash memory, magnetic hard drive, CD-ROM, DVD-ROM, or the like. In at least one embodiment, data store 106 may store information that can be utilized and/or displayed according to the techniques described below. Data store 106 may be implemented in a database or using any other suitable arrangement. In another embodiment, data store 106 may be stored elsewhere, and data from data store 106 may be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data for performing various tasks and operations in connection with the functionality described herein, including for example collection data from various sources, performing aggregation and analysis on such data, and/or the like. In at least one embodiment, some or all of such data may be stored at another location, remote from device 101, and device 101 may access such data over a network, via any suitable communications protocol.

In at least one embodiment, data store 106 may be organized in a file system, using well-known storage architectures and data structures, such as relational databases. Examples include Oracle, MySQL, and PostgreSQL. Appropriate indexing may be provided to associate data elements in data store 106 with each other. In at least one embodiment, data store 106 may be implemented using cloud-based storage architectures such as NetApp (available from NetApp, Inc. of Sunnyvale, California) and/or Amazon Simple Storage Service (Amazon S3) (available from Amazon.com of Seattle, Washington).

Data store 106 may be local or remote with respect to the other components of device 101. In at least one embodiment, device 101 may be configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 may be detachable in the form of a CD-ROM, DVD, flash drive, USB hard drive, or the like. Information may be entered from a source outside of device **1*o*1 into data store 106 that may be detachable, and later displayed after data store 106 may be connected to device 101. In another embodiment, data store 106 may be fixed within device 101**.

In at least one embodiment, data store 106 may be organized into one or more well-ordered data sets, with one or more data entries in each set. Data store 106, however, may have any suitable structure. Accordingly, the particular organization of data store 106 need not resemble the form in which information from data store 106 may be displayed to user 100 on display screen 103. In at least one embodiment, an identifying label may also be stored along with each data entry, to be displayed along with each data entry.

Display screen 103 may be any element that displays information such as text and/or graphical elements. In particular, display screen 103 may present a user interface for entering, viewing, configuring, selecting, editing, downloading, and/or otherwise interacting with data as described herein. In at least one embodiment where only some of the desired output may be presented at a time, a dynamic control, such as a scrolling mechanism, may be available via input device 102 to change which information may be currently displayed, and/or to alter the manner in which the information may be displayed. In at least one embodiment, display screen 103 may be omitted or functionally combined with one or more other components.

Processor 104 may be a conventional microprocessor for performing operations on data under the direction of software, according to well-known techniques. Memory 105 may be random-access memory, having a structure and architecture as are known in the art, for use by processor 104 in the course of running software.

Communication device 107 may communicate with other computing devices via any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
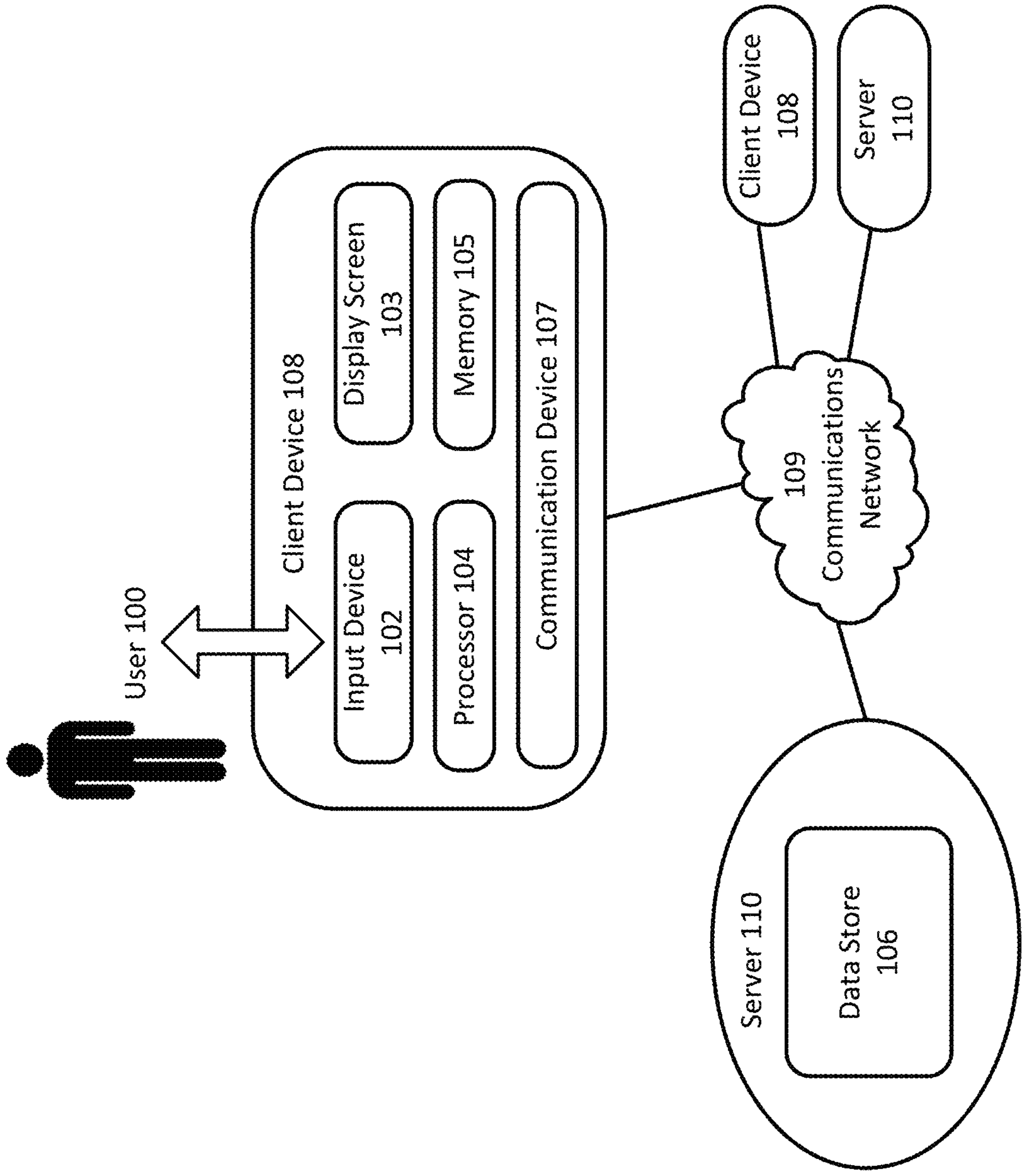
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing may be done completely independently from user input/output. An example of such a client/server environment is a web-based implementation, wherein client device 108 runs a browser that provides a user interface for interacting with web pages and/or other web-based resources from server 110. Items from data store 106 may be presented as part of such web pages and/or other web-based resources, using known protocols and languages such as Hypertext Markup Language (HTML), Java, JavaScript, and the like.

Client device 108 may be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, may be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 may transmit requests for data via communications network 109, and may receive responses from server **11*o*** containing the requested data. Such requests may be sent via HTTP as remote procedure calls or the like.

In at least one embodiment, server no may be responsible for data storage and processing, and may incorporate data store 106. Server no may include additional components as needed for retrieving data from data store 106 in response to requests from client device 108.

As described above in connection with FIG. 1, data store 106 may be organized into one or more well-ordered data sets, with one or more data entries in each set. Data store 106 may, however, have any suitable structure, and may store data according to any organization system known in the information storage arts, such as databases and other suitable data storage structures.

In addition to or in the alternative to the foregoing, data may also be stored in data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 may be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. Communication device 107 may communicate with other computing devices using any known wired and/or wireless protocol(s), as discussed above in connection with FIG. 1.

In at least one embodiment, some or all of the system may be implemented as software written in any suitable computer programming language, whether in a standalone or client/server architecture. Alternatively, some or all of the system may be implemented and/or embedded in hardware.

Notably, multiple client devices 108 and/or multiple servers 110 may be networked together, and each may have a structure similar to those of client device 108 and server 110 that are illustrated in FIG. 2. The data structures and/or computing instructions used in the performance of methods described herein may be distributed among any number of client devices 108 and/or servers **11*o*. As used herein, "system" may refer to any of the components, or any collection of components, from FIGS. 1 and/or 2, and may include additional components not specifically described in connection with FIGS. 1 and 2**.

In some embodiments, data within data store 106 may be distributed among multiple physical servers. Thus, data store 106 may represent one or more physical storage locations, which may communicate with each other via the communications network and/or one or more other networks (not shown). In addition, server no as depicted in FIG. 2 may represent one or more physical servers, which may communicate with each other via communications network 109 and/or one or more other networks (not shown). Part of data store 106 may reside on device 101 and/or client device 108.

In one embodiment, some or all components of the system may be implemented in software written in any suitable computer programming language, whether in a standalone or client/server architecture. Alternatively, some or all components may be implemented and/or embedded in hardware.

Functional Architecture

Figure 3:
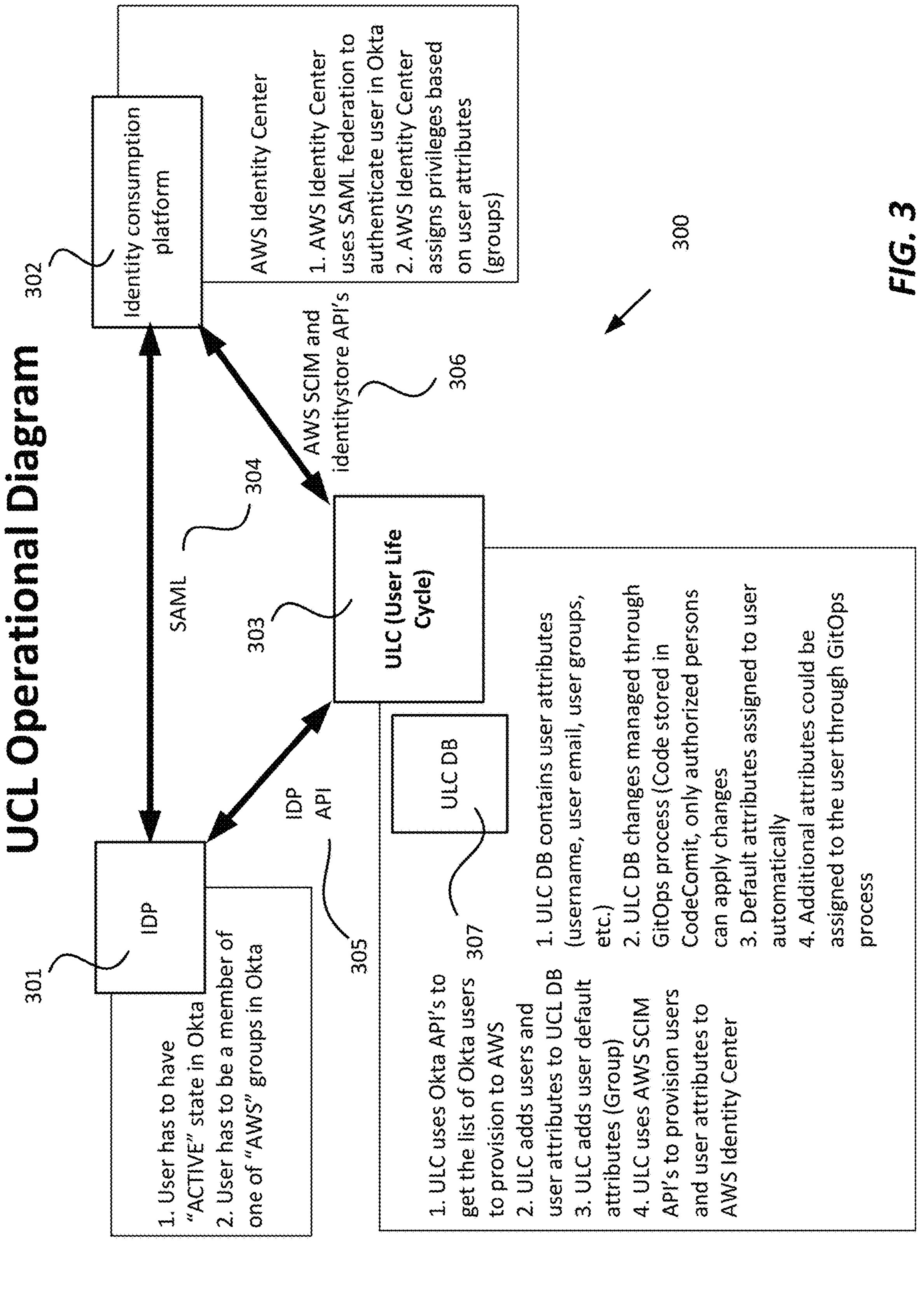
FIG. 3 is a block diagram depicting a functional architecture for the described system, showing relationships among various infrastructure components and system software components, along with functionality performed by each such component, according to one embodiment.

Referring now to FIG. 3, there is shown an example of a functional architecture 300 for the described system, showing the relationships among various infrastructure components and system software components, along with functionality performed by each such component, according to one embodiment. In at least one embodiment, functional architecture 300 may be implemented using hardware components such as those described above in connection with FIGS. 1 and/or 2. One skilled in the art will recognize, however, that other hardware architectures may be used to implement the depicted functional architecture.

In at least one embodiment, the described functionality may be implemented in a user lifecycle component (ULC) 303 that may be communicatively situated between an IDP 301 and an identity consumption platform 302. The described techniques may be implemented in connection with any suitable IDP 301, such as for example the Okta Customer Identity Cloud provided by Okta, Inc. of San Francisco, California. The described techniques may be implemented in connection with any identity consumption platform 302, such as for example Amazon Web Services IAM Identity Center (AWS IAM IDC, or AWS IDC, or simply AWS), available from Amazon Web Services, Inc. of Seattle, Washington.

According to the techniques described herein, IDP 301 (Okta) may be delegated IDP responsibilities and may provide identity authentication to identity consumption platform 302, while ULC 303 may provide provisioning and attribute management that may be further used for authorization within identity consumption platform 302.

In at least one embodiment, ULC 303 may use APIs associated with IDP 301 to read identity statuses. In at least one embodiment, ULC 303 may also use its own attribute mapping database (ULC DB) 307, which may contain, for example, mappings of identity group attributes to sets of groups. Such database 307 and the mappings therein may be under full control of an end system management team, and/or may be automated. Team members may modify user attribute mappings in ULC DB 307 as desired, and ULC 303 may then use System for Cross-domain Identity Management (SCIM) Application Programming Interfaces (APIs) 306 to read and write identity state into identity consumption platform 302. In at least one embodiment, ULC 303 may also use AWS identity store APIs 306 to compensate for deficiencies of the AWS SCIM APIs implementation. Such deficiencies may include, for example:

- the inability to handle more than 50 groups in SCIM call (a call to get groups is limited to 50 entries, and there is no pagination); and
- the inability to determine Group membership (AWS SCIM implementation does not retrieve Group membership; neither User memberOf, nor Group membership fields are filled in).

In at least one embodiment, the user attributes stored in ULC DB 307 may include, for example, usernames, user email addresses, user groups, and/or the like. Changes to data in ULC DB 307 may be managed through a suitable process that allows only authorized persons to apply changes; one example may be a GitOps process. Default attributes may be assigned to users automatically. Additional attributes may be assigned to users via the GitOps (or similar) process.

In at least one embodiment, ULC 303 may be implemented as a scheduled Jenkins job running a java spring boot CommandLineRunner application uber jar that uses:

- Okta APIs to read Okta user profiles, as well as groups responsible for authentication against AWS Organizations (a group per Organization);
- An AWS SCIM API implementation to read individual users and groups, and create/update/delete them;
- AWS identity store APIs to read information about users and groups.
- An attribute mapping database that may be implemented as a JSON file per AWS Organization sitting in an AWS CodeCommit git repository. The ULC may use this database to create, update, and/or delete user identity group attributes which may be [de]provisioned [from] to AWS IDC.

One skilled in the art will recognize that the above-described specific techniques are merely exemplary, and that the described system may be implemented using other technologies, tools, and/or protocols.

In at least one embodiment, for the described system to operate, each user may be in an ACTIVE state in connection with IDP 301, and may be a member of a group in IDP 301 associated with identity consumption platform (such as an "AWS" group).

In at least one embodiment, identity consumption platform 302, which may be an AWS IAM Identity Center, may use Security Assertion Markup Language (SAML) federation or the like to authenticate users in IDP 301. Identity consumption platform 302 may assign privileges based on user attributes (groups).

In at least one embodiment, ULC 303 uses APIs 305 to obtain a list of Okta users to provision to identity consumption platform 302. ULC 303 then adds those users and their attributes to ULC DB 307. ULC 303 then adds user default attributes to a group associated with users, and uses AWS SCIM and identity store API's 306 to provision users and user attributes to identity consumption platform 302.

Operation

In at least one embodiment, ULC 303 may start by reading data for all ACTIVE, LOCKED, and DEPROVISIONED users received from IDP 301. This information may be passed to the a sync service associated with identity consumption platform 302, which may also be fed a JSON document attribute mapping database that may be read into memory for faster access.

In general, a conventional AWS SCIM server implementation has three major deficiencies:

- The SCIM client can only retrieve a limited number (50) of users from the Amazon AWS SCIM server implementation.
- The SCIM client can only retrieve a limited number (50) of groups from the Amazon AWS SCIM server implementation.

It does not retrieve either user group membership or a group's user membership. Therefore, it may not be possible to learn what users belong to what group using AWS SCIM APIs. The only call available may be to check if a given user belongs to a given group; however, such an approach may be impractical, especially with a large number of users and/or groups.

The system and method described herein address such deficiencies. For example, in at least one embodiment, an AWS sync algorithm may be implemented using a full list of IDP (Okta) 301 users to retrieve users via AWS SCIM APIs 306 one-by-one using their external id (email), which may be available only in the Okta user profile. In at least one embodiment, in order to overcome AWS SCIM group reading limitations, ULC 303 may operate as follows:

Avoid reading groups from SCIM 306.

Calculate all the required group lists based on the ULC DB 307, and issue a create group call for each group. If a group does not exist, it may be created on the fly. If it already exists, it may be used without any changes.

Avoid deleting groups from AWS SCIM 306. Rather, this function may be delegated to the Cloud Security team that may perform such deletions via the AWS Console if needed.

Uses a PatchGroup SCIM call to add/remove users to/from a group.

Such techniques, as described herein, may overcome deficiencies of a conventional AWS SCIM implementation.

Another issue with existing SCIM API implementations is that AWS may throttle the caller. One approach to the necessity to retrieve each user one-by-one is to parallelize the process. However, throttling is often imposed when the rate of API calls exceeds the allowable maximum rate. In some cases, even sequential calls may be unreliable and may be rejected (by throttling). Introducing a delay between calls may help stabilize ULC 303.

In at least one embodiment, an AWS identity store API may be used to read users, groups, and group membership information from identity consumption platform 302. This may simplify the SCIM integration code, specifically because it no longer has to try reading every single Okta user from AWS SCIM 306 to figure out if a user identity is in identity consumption platform 302. However, in some cases, the system cannot read identity status using the AWS identity store API, since such information may only be available from AWS SCIM 306. Accordingly, the system may first read all users using an AWS identity store API to obtain all currently provisioned users, and then read each user via SCIM 306 in order to get their status. Such a method still improves upon previous approaches because it significantly reduces the number of calls, since the system already knows all existing AWS IDC users.

In general, AWS SCIM provisioned users and groups may have limited modification ability via other AWS APIs; for example, even an IDC administrator cannot generally add a SCIM-provisioned user (identity) or group, or modify SCIM-provisioned group membership; such limitations create security guardrails in AWS IDC compared to manually provisioned users/groups. Administrators can delete users/groups, but they may be restored by the next ULC provisioning, which may occur at any suitable periodic interval, such as for example every 15 minutes.

In at least one embodiment, when AWS IDC SCIM provisioning may be enabled, administrators may not be permitted to create new users/groups, or to change group membership.

Method

Figure 4:
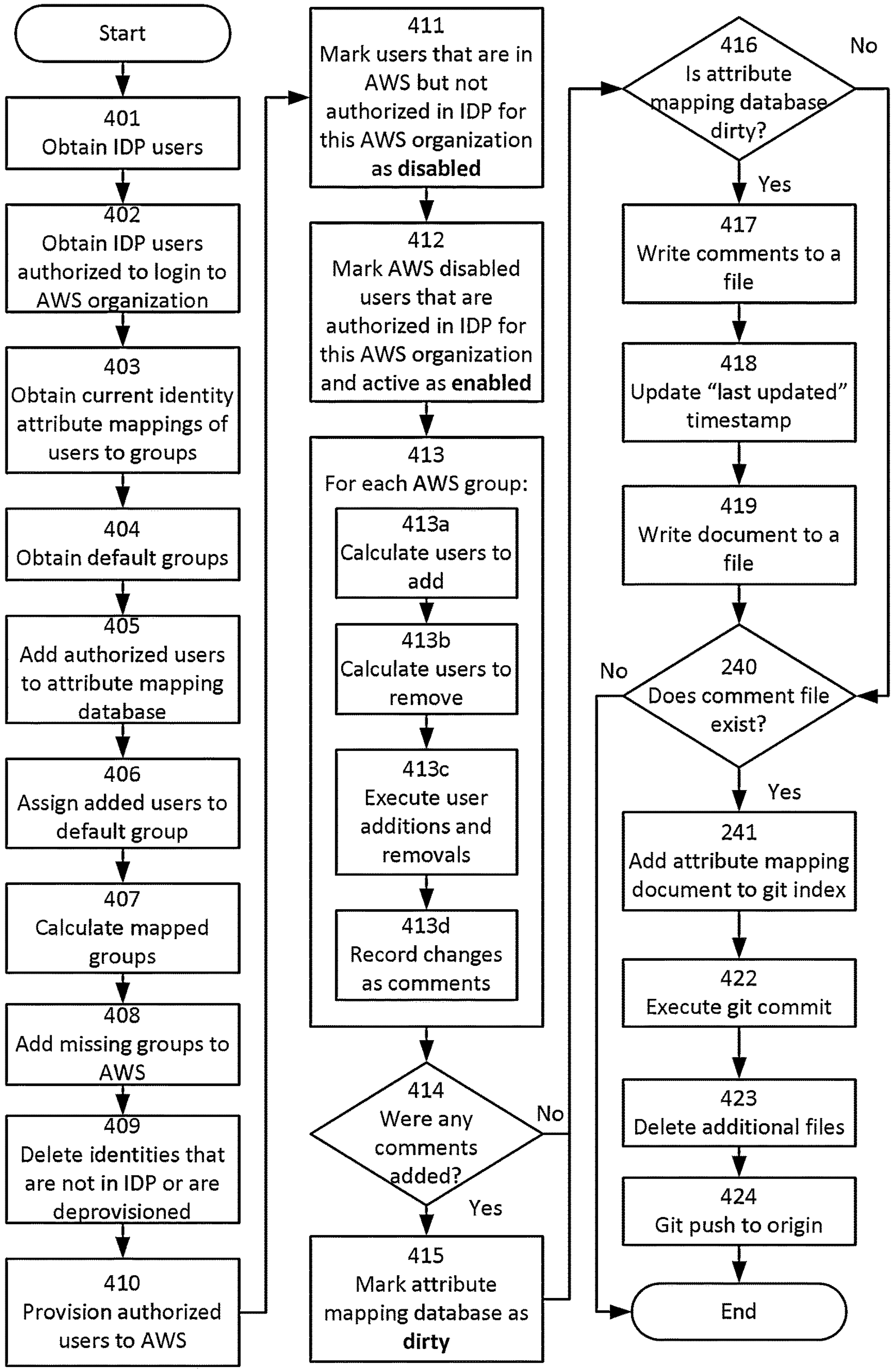
FIG. 4 is a flow diagram depicting an example of a method for performing identity management according to one embodiment.

Referring to FIG. 4, there is shown an example of a method for performing identity management according to one embodiment. In FIG. 4, for illustrative purposes, the operation of the system is described in the context of a system having a functional architecture as depicted in FIG. 3, and a hardware architecture as depicted in FIGS. 1 and/or 2.

In step 401, the system may obtain all IDP (e.g., Okta) users with their statuses via IDP API 305.

In step 402, the system may obtain, via IDP API 305, all IDP users that are authorized to login to a particular AWS Organization.

In step 403, the system may obtain, from an AWS Organization specific attribute mapping database, current identity attribute mappings of users to groups. In at least one embodiment, the attribute mapping database may be implemented as an AWS internal database that may be provisioned and/or deprovisioned by ULC 303 based on ULC database 307, which may serve as a source of truth for such attribution.

In step 404, the system may obtain, from the AWS Organization specific attribute mapping database, default groups that are to be assigned to a user if the user or their identity is not mapped in the attribute mapping database. This default may specify, for example, a minimal common privileges AWS group for all users. In an alternative embodiment, the system may optionally provide a default group per user team, where "team" may be defined as an expression on a user's profile on IDP 301, and may be based on any suitable affiliation, such as for example, cost center, department, title, manager, and/or the like.

In step 405, the system may add IDP AWS Organization authorized users to the attribute mapping database if they are not there. In step 406, the added users may be assigned to the default group.

In step 407, the system may calculate all mapped groups based on the attribute mapping database.

In step 408, the system may add missing groups to identity consumption platform 302 (e.g., AWS) via SCIM APIs 306.

In step 409, the system may delete all AWS IDC identities that are not in IDP 301 or are marked as deprovisioned in IDP 301 from AWS using SCIM 306. If a deleted user is in the attribute mapping database, the user may be deleted from the attribute mapping database as well.

In step 410, the system may provision all IDP AWS Organization authorized users to identity consumption platform 302 via SCIM APIs 306.

In step 411, the system may mark all users that are in identity consumption platform 302 but not authorized in IDP 301 for this AWS Organization as disabled via a SCIM PatchUser call.

In step 412, the system may mark all AWS disabled users that are authorized in IDP 301 for this AWS Organization and are marked as active in IDP 301 as enabled in the identity center associated with identity consumption platform 302 via a SCIM PatchUser call.

In step 413, for each AWS group, the system may perform substeps 413*a* through 413*d*: First, it calculates users to add, based on the attribute mapping database (step 413*a*). Then it calculates users to remove, based on the attribute mapping database (step 413*b*). Then it executes the user additions and removals, for example via AWS SCIM PatchGroup calls (step 413*c*). In some cases, the AWS SCIM PatchGroup implementation may limit the batch size; therefore, if necessary, large batches may be split into smaller ones of a number of elements that falls within the limit (such as for example 30 elements at a time). AWS SCIM call throttling may also be addressed. During execution of substeps 413*a* through 413*c*, all changes (such as additions, deletions, and/or modifications of users and/or groups) may be recorded as comments, for example, with each change being recorded as a discrete comment (step 413*d*).

In step 414, a determination may be made as to whether any comments were added. If so, in step 415, the in-memory attribute mapping database may be marked as "dirty".

In step 416, ULC 303 checks if the in-memory attribute mapping database may be dirty. If so, steps 417 through 419 may be performed. In step 417, the system may write comments to a file. In step 418, it may modify the attribute mapping database (which may be an in-memory JSON document) by updating the "last updated" timestamp. In step 419, it may write the document to a file. In at least one embodiment, the in-memory JSON document may be sorted by identity ID and beautified, so as to simplify subsequent manual modifications of the document if needed.

In step 420, ULC 303 may check if a comments file exists; this may be done, for example, by a Jenkins job that runs java code. If so, steps 421 through 424 may be performed. In step 421, ULC 303 may add the organization attribute mapping document to the git index. In step 422, ULC 303 may execute git commit with all the comments from the file. In step 423, it may delete all additional files (such as comment files and the like). In step 424, it may execute a git push to the origin that resides in AWS CodeCommit service. In at least one embodiment, ULC 303 may run in a specially designated Cloud Security account controlled by the Cloud Security team. This account may also host CodeCommit and CodeArtifact AWS services that contain all related code and artifacts. In at least one embodiment, a standards-based SDLC driven by Apache Maven CI/CD pipelines may also reside on the same Jenkins, and may provide SNAPSHOT publishing and main branch releases into a CodeArtifact repository.

The method then ends.

CONCLUSION

By decoupling identity management and authentication from attribute provisioning, the described system and method allow control of identity attribute management and provisioning to be left in the hands of a team responsible for the protected system, while identity management and authentication may be performed by an IDP platform such as Okta. The architecture thus allows the team responsible for the protected system to trust identity attributes and use them to grant and/or revoke relevant privileges in the end system (such as AWS IDC).

The ULC implementation described herein may be simple and reliable, while solving the problem of separation of responsibilities between teams managing IDP and identity attributes for a particular protected system, such as for example AWS Organization. One skilled in the art will recognize that the described techniques may be used in connection with other systems as well.

In at least one embodiment, ULC 303 may be implemented using a single binary file for running the code produced by a corresponding CI/CD process and a git repository that may be used to host an attribute mapping database in the form of a JSON file per AWS Organization. It can run with essentially no human intervention as a scheduled Jenkins job. A git repository may be used to capture and attribute (to team members and/or automated process) all changes in the attribute mapping database and external (to this file) events that happen during provisioning as git file commit comments.

Such comments may also be used for audit and compliance, which may serve as proof that the system is working correctly. In at least one embodiment, change management is verbalized, for example via comments created by ULC 303 on each run, and recorded as git comments. Git may record any changes as a hash, and may track all changes; a graph of such hash values may serve as a proof of audit trail correctness.

The described system and method can overcome deficiencies of conventional AWS SCIM API implementations, such as any imposed hard limit on the number of users and groups that one can read via such APIs, as well as an inability to read group membership information via AWS SCIM APIs.

The Figures and accompanying description are intended to be illustrative of one or more embodiments by which the system and method may be implemented. However, one skilled in the art will recognize that the system may be implemented using different components than depicted in FIGS. 1-3, and using steps that differ from those depicted in FIG. 4. Accordingly, the system and method depicted and described in the Figures and accompanying description are merely exemplary.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. In addition, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments may be included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It may be convenient at times, principally for reasons of common usage, to refer to these signals as bits, values, elements, symbols, characters, terms, numbers, or the like. Furthermore, it may also be convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it may be appreciated that throughout the description, discussions utilizing terms such as “processing” or “computing” or “calculating” or “displaying” or “determining” or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions may be embodied in software, firmware and/or hardware, and when embodied in software, may be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device may include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that may be adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for identity management, comprising:

automatically assigning identity management and authentication responsibilities to an identity provider;

automatically assigning attribute provisioning to a component that is separate from the identity provider;

establishing communication among the identity consumption platform, the identity provider, and the separate component, to enable identity management and authentication by the identity provider and to further enable attribute provisioning by the separate component;

at the separate component:

performing attribute provisioning for the identity consumption platform;

obtaining, from the identity provider, a list of users to provision to the identity consumption platform; and obtaining, from the identity provider, attributes for the users;

assigning default attributes to the users based on group membership;

storing the user attributes in a database; and retrieving the stored user attributes to provision users and user attributes for the identity consumption platform.

2. The method of claim 1, wherein automatically assigning attribute provisioning to the separate component comprises automatically assigning attribute mapping to the separate component.

3. The method of claim 1, wherein the identity provider comprises an Okta identity cloud.

4. The method of claim 1, wherein the identity consumption platform comprises an AWS IAM Identity Center.

5. The method of claim 1, wherein the separate component comprises a user lifecycle component.

6. The method of claim 1, wherein obtaining the list of users to provision to the identity consumption platform comprises using APIs associated with the identity provider.

7. The method of claim 1, wherein performing attribute provisioning for the identity consumption platform comprises using APIs associated with the identity consumption platform.

8. The method of claim 7, wherein the APIs associated with the identity consumption platform comprise AWS SCIM APIs.

9. A non-transitory computer-readable medium for identity management, comprising instructions stored thereon, that when performed by one or more hardware processing devices, perform the steps of:

automatically assigning identity management and authentication responsibilities to an identity provider;

automatically assigning attribute provisioning to a component that is separate from the identity provider;

establishing communication among the identity consumption platform, the identity provider, and the separate component, to enable identity management and authentication by the identity provider and to further enable attribute provisioning by the separate component; and causing the separate component to perform attribute provisioning for the identity consumption platform;

causing the separate component to obtain, from the identity provider, a list of users to provision to the identity consumption platform;

causing the separate component to obtain, from the identity provider, attributes for the users;

assigning default attributes to the users based on group membership;

causing the user attributes to be stored in a database; and retrieving the stored user attributes to provision users and user attributes for the identity consumption platform.

10. The non-transitory computer-readable medium of claim 9, wherein automatically assigning attribute provisioning to the separate component comprises automatically assigning attribute mapping to the separate component.

11. The non-transitory computer-readable medium of claim 9, wherein the identity provider comprises an Okta identity cloud.

12. The non-transitory computer-readable medium of claim 9, wherein the identity consumption platform comprises an AWS IAM Identity Center.

13. The non-transitory computer-readable medium of claim 9, wherein the separate component comprises a user lifecycle component.

14. The non-transitory computer-readable medium of claim 9, wherein obtaining the list of users to provision to the identity consumption platform comprises using APIs associated with the identity provider.

15. The non-transitory computer-readable medium of claim 9, wherein performing attribute provisioning for the identity consumption platform comprises using APIs associated with the identity consumption platform.

16. The non-transitory computer-readable medium of claim 15, wherein the APIs associated with the identity consumption platform comprise AWS SCIM APIs.

17. A system for identity management, comprising:

a processor configured to automatically assign identity management and authentication responsibilities to an identity provider;

a component that is separate from the identity provider and is communicatively coupled to the processor; and a database;

wherein:

the processor is further configured to:

automatically assign attribute provisioning to the separate component; and establish communication among the identity consumption platform, the identity provider, and the separate component, to enable identity management and authentication by the identity provider and to further enable attribute provisioning by the separate component; and the separate component is configured to:

perform attribute provisioning for the identity consumption platform;

obtain, from the identity provider, a list of users to provision to the identity consumption platform;

obtain, from the identity provider, attributes for the users;

the processor is further configured to assign default attributes to the users based on group membership;

the database is configured to store the user attributes; and the processor is further configured to retrieve the stored user attributes to provision users and user attributes for the identity consumption platform.

18. The system of claim 17, wherein automatically assigning attribute provisioning to the separate component comprises automatically assigning attribute mapping to the separate component.

19. The system of claim 17, wherein the identity provider comprises an Okta identity cloud.

20. The system of claim 17, wherein the identity consumption platform comprises an AWS IAM Identity Center.

21. The system of claim 17, wherein the separate component comprises a user lifecycle component.

22. The system of claim 17, wherein obtaining the list of users to provision to the identity consumption platform comprises using APIs associated with the identity provider.

23. The system of claim 17, wherein performing attribute provisioning for the identity consumption platform comprises using APIs associated with the identity consumption platform.

24. The system of claim 23, wherein the APIs associated with the identity consumption platform comprise AWS SCIM APIs.

* * * * *